No. 658,520. Patented Sept. 25, 1900.
B. ABEL.
CLUTCH PULLEY.
(Application filed May 22, 1900.)
(No Model.) 2 Sheets—Sheet 1.

Witnesses. Inventor.
L. M. Billings. Barnard Abel.
G. A. Heubrener. By James Langstadt & Co. Attorneys.

No. 658,520. Patented Sept. 25, 1900.
B. ABEL.
CLUTCH PULLEY.
(Application filed May 22, 1900.)
(No Model.) 2 Sheets—Sheet 2.
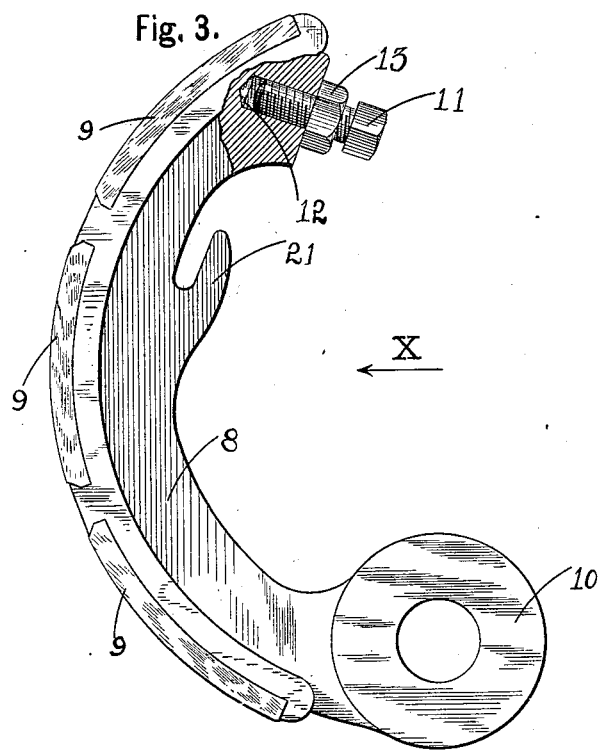
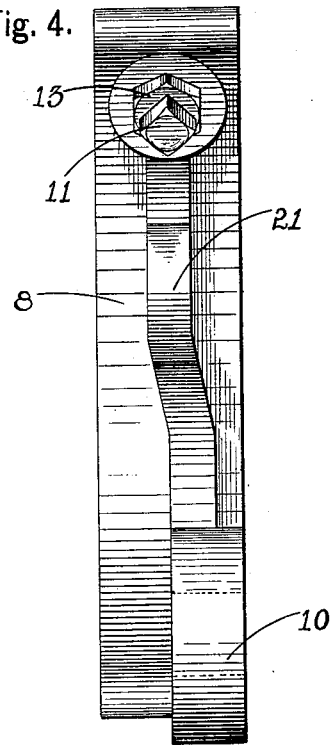
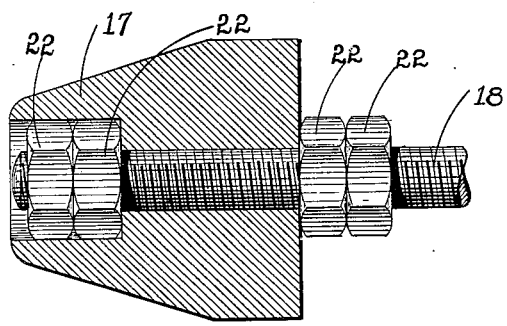
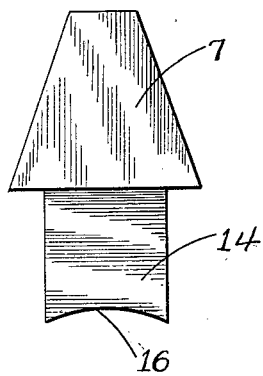
Witnesses.
L. M. Billings.
G. A. Neubauer.
Inventor.
Barnard Abel.
By James Sangster & Co Attorneys.

UNITED STATES PATENT OFFICE.

BARNARD ABEL, OF TITUSVILLE, PENNSYLVANIA.

CLUTCH-PULLEY.

SPECIFICATION forming part of Letters Patent No. 658,520, dated September 25, 1900.

Application filed May 22, 1900. Serial No. 17,550. (No model.)

*To all whom it may concern:*

Be it known that I, BARNARD ABEL, a citizen of the United States, residing at Titusville, in the county of Crawford and State of Pennsylvania, have invented certain new and useful Improvements in Clutch-Pulleys, of which the following is a specification.

My invention relates to an improved clutch-pulley adapted to be attached to the fly-wheel of an engine or other suitable place and having clutching-segments which are brought into clutching engagement by the movement of a wedge device; and the object of the invention is to provide a simple and convenient device of this character.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof, and to a full disclosure of the invention an adaptation thereof is shown in the accompanying drawings, in which—

Figure 1:
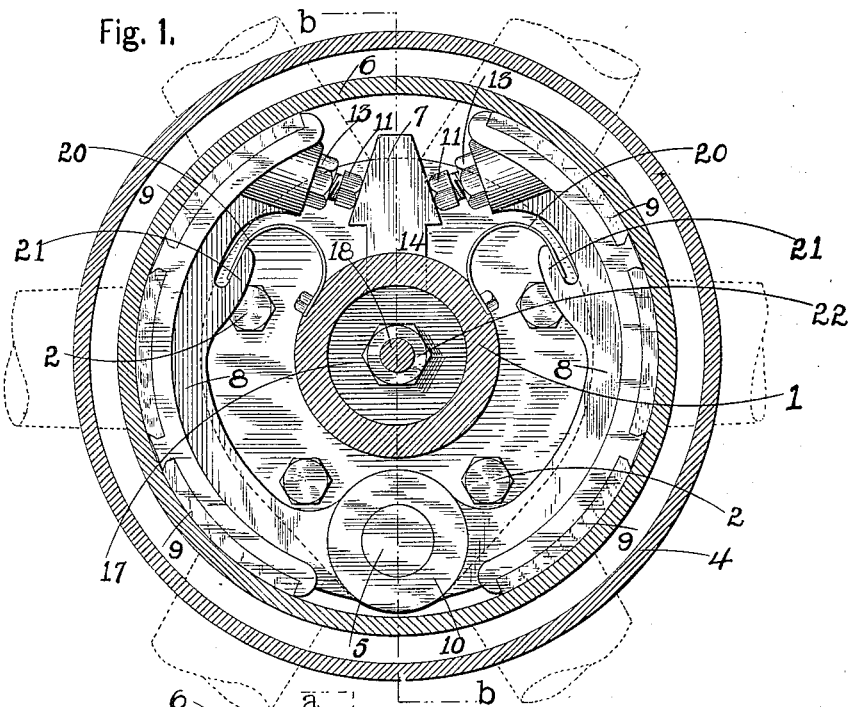
Figure 2:
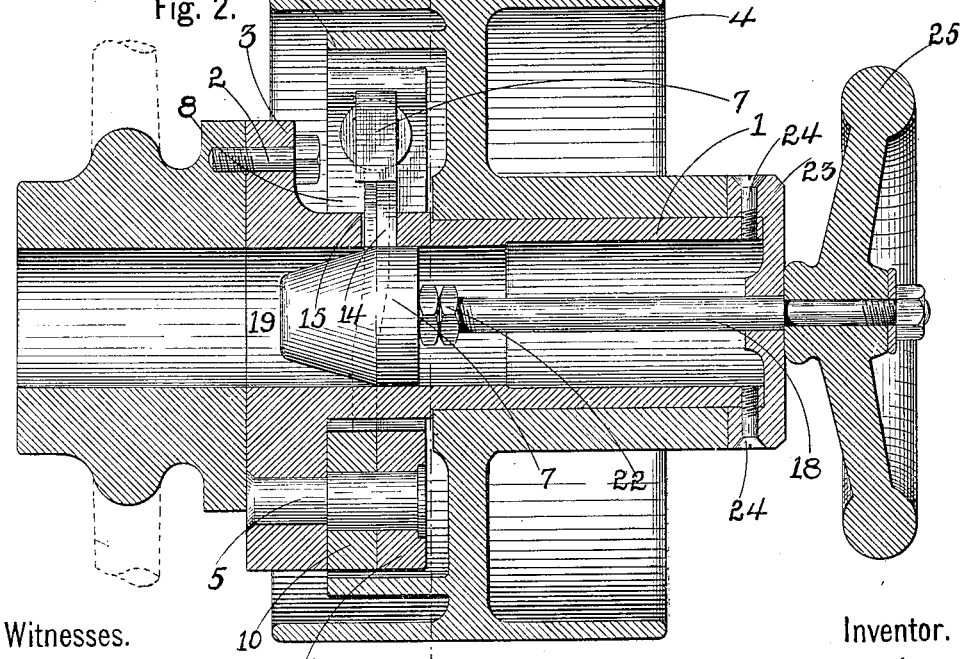

Figure 1 represents a transverse section on or about line $a\,a$, Fig. 2. Fig. 2 is a central longitudinal section on line $b\,b$, Fig. 1. Fig. 3 is an enlarged detached side view of one of the clutching-segments. Fig. 4 is an enlarged detached view of one of the clutching-segments looking in the direction of the arrow X, Fig. 3. Fig. 5 is an enlarged central longitudinal section through the cone-wedge. Fig. 6 is an enlarged view of the operating-wedge.

In referring to the drawings in detail like numerals designate like parts.

The invention consists of a tubular portion 1, which is rigidly attached to a rotating part, such as the fly-wheel of an engine, by the bolts 2, passed through the flange 3 into the fly-wheel, a pulley portion 4, mounted loosely upon the tubular portion 1, and clutching mechanism pivotally supported from the flange 3 and adapted to be brought into frictional engagement with the loose pulley to cause it to rotate in unison with the fly-wheel or other part to which the tubular portion 1 is attached. Segments, preferably two in number, are pivotally mounted upon a common pintle 5 and are forced into frictional engagement with the interior of the pulley-ring 6 by a separating-wedge 7. Each segment is preferably formed as shown in Figs. 3 and 4, having a curved body 8, provided with shallow depressions or recesses on its outer edge, in which friction devices, such as pieces of suitable wood 9, are placed, a perforated pivoting-ear 10 at one end, and an adjusting device—as, for instance, the screw-bolt 11—at the opposite end. These segments are arranged upon the pintle 5 with said pintle extending through each perforated ear 10 and curve from each other, conforming substantially to the interior of the ring 6. (See Fig. 1.) The screw-bolts 11 are screwed into screw-threaded depressions 12 in the inner surface of the segments, at or near the opposite ends thereof, and are arranged so that their heads bear against the opposite beveled sides of the separating-wedge 7, the screw-bolts 11 being screwed in or out of the depressions to adjust the segments relatively to the pulley-ring 6 and being locked in their adjusted position by the lock-nuts 13.

The separating-wedge 7 is preferably formed substantially similar to a blunt arrow-head and has a short shaft 14, which fits and slides in the opening or slideway 15, (see Fig. 2,) the bottom edge of the shaft 14 being concaved, substantially as indicated at 16 in Fig. 6. The separating-wedge 7 is forced outwardly or radially from the center point of the pulley by a cone 17, mounted on the end of a spindle 18, which slides in the opening 19 in the tubular part 1 and bears against the concaved edge of the shaft of the wedge 7. U-shaped springs 20 are employed to normally maintain the segments in inoperative position, one end of each spring being bolted to the tubular part 1 and the other fitted over the lip 21, extending from one of the segments. (See Fig. 1.) The cone is secured upon the end of the spindle by the lock-nuts 22. A cap 23, provided with a center opening for the passage of the spindle, is fitted over the outer end of the tubular part 1 and is secured thereto by the screws 24. A hand-wheel 28 or other suitable device is secured to the outer end of the spindle.

In operating the device the segments are forced against the interior of the ring by moving the spindle in toward the fly-wheel or other object to which the pulley is attached, thereby forcing the separating-wedge outward and separating the segments.

I claim as my invention—

1. A clutch-pulley comprising a rotatable tubular part, a loose pulley on said part, clutching mechanism pivoted to said tubular part, a wedge for separating said clutching mechanism having a concave bottom edge, and a spindle carrying a cone fitting against the concave bottom of the wedge for operating said wedge.

2. A clutch-pulley comprising a rotatable tubular part, a loose pulley on said part, clutching-segments pivoted at one end to said tubular part by a common pivoting-pintle and having adjustable parts at the opposite end, a wedge for separating said clutching-segments having bearing against the adjustable parts, and a spindle carrying a cone slidable in the tubular part for operating said wedge.

3. A clutch-pulley comprising a rotatable tubular part, a loose pulley on said part, clutching-segments pivoted at one end by a common pivot to said tubular part, a wedge for separating the opposite ends of said segments, means for operating said wedge and adjusting devices at the unpivoted ends of the segments and bearing against the wedge.

4. A clutch-pulley comprising a rotatable tubular part, having a radial opening, a loose pulley on said part, curved clutching-segments, each having a perforated pivoting-ear at one end and a screw-threaded depression at or near the opposite end, a screw-bolt fitting in said depression and forming an adjusting device for the segment, a pintle passing through the pivoting-ears for securing the segments to the tubular part, a separating-wedge having sides bearing against the heads of the screw-bolts in the segments, and slidably mounted in the radial opening in the tubular part, and a spindle carrying a cone sliding in the central opening in the tubular part; said cone opening the wedge.

5. A clutch-pulley comprising a rotatable tubular part, a loose pulley mounted on said part, clutching-segments carried by said tubular part and each having a lip, means for moving said segments into frictional contact with the pulley, and U-shaped springs, each having one end fastened to the tubular part and the opposite end fitted over the lip of one of the segments for normally retaining said segments in inoperative position.

6. A clutch-pulley comprising a tubular part fastened to a rotating element and having a radial opening, a pulley mounted loosely on the tubular part, clutch devices pivoted to said tubular part by a common pintle, an arrow-head wedge interposed between the opposite portions of said clutch devices, and provided with a reduced shaft sliding in the radial opening, and means for moving said wedge to separate the clutch devices and lock the pulley to the tubular part.

7. A clutch-pulley comprising a tubular part fastened to a rotating element and having a radial opening, a pulley mounted loosely on the tubular part, clutch devices pivoted to said tubular part, a wedge interposed between the opposite portions of said clutch devices and having a shaft sliding in the radial opening in the tubular part, and provided with a concave bottom edge, and a cone device bearing against the concave bottom edge of the wedge for radially moving said wedge to separate the clutch devices and lock the pulley to the tubular part.

8. A clutch-pulley comprising a rotatable tubular part, having a radial opening, a loose pulley on said part, curved clutching-segments, each having a perforated pivoting-ear at one end and a screw-threaded depression at or near the opposite end, a screw-bolt fitting in said depression and forming an adjusting device for the segment, a pintle passing through the pivoting-ears for securing the segments to the tubular part, a separating-wedge having sides bearing against the heads of the screw-bolts in the segments, and slidably mounted in the radial opening in the tubular part, a spindle carrying a cone sliding in the central opening in the tubular part; said cone operating the wedge, and springs for normally holding said segments in inoperative position.

BARNARD ABEL.

Witnesses:
J. W. BOONE,
B. F. KRAFFERT.